Figure 1:
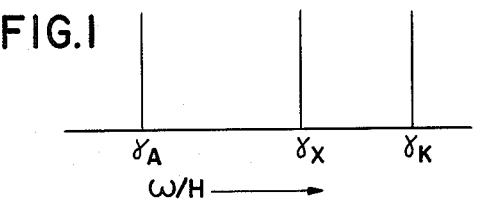

April 5, 1966   F. A. NELSON ETAL   3,244,968
SPIN DECOUPLING OF GYROMAGNETIC PARTICLES
Filed Feb. 26, 1963

INVENTORS
FORREST A. NELSON
GEORGE A. BAKER
BY  Wm. J. Nolan
ATTORNEY

United States Patent Office 3,244,968
Patented Apr. 5, 1966

3,244,968
SPIN DECOUPLING OF GYROMAGNETIC
PARTICLES
Forrest A. Nelson, Palo Alto, and George A. Baker,
San Carlos, Calif., assignors to Varian Associates, a
corporation of California
Filed Feb. 26, 1963, Ser. No. 261,185
7 Claims. (Cl. 324—.5)

The present invention relates in general to gyromagnetic resonance spectroscopy, and more particularly to a novel method and apparatus for effecting a more complete collapse of spectral line splittings due to the spin-coupling of gyromagnetic particles.

Gyromagnetic spectroscopy involves the non-destructive testing of samples containing gyromagnetic particles, that is, particles possessing both a gryroscopic moment or spin and a magnetic moment. Nuclei of non-zero spin and unpaired electrons are examples of such gryromagnetic particles. The sample is placed in a polarizing magnetic field of intensity H and an alternating magnetic field of frequency $\omega$ (usually a radio frequency) is applied at an angle (usually 90°) to H. The ratio $\omega/H$ is swept through a range of values, including the gyromagnetic ratio $\gamma$, at which gyromagnetic resonance precessions of the sample particles are produced. This condition of resonance is then detected and correlated with the sweep to yield a spectral line display indicative of many interesting chemical and physical properties of the sample.

The gyromagnetic resonance spectrum can become quite complicated and difficult to interpret when the sample contains two or more spin-coupled groups of particles with different gyromagnetic ratios. For example, in the case of different gyromagnetic nuclei in the same molecule, these groups may be different nuclear species, or two chemically-shifted groups of the same nuclear species in a situation where the chemical shift is large compared to the spin coupling constant J. Such spin coupling results in a multiple splitting of the spectral lines.

U.S. Patent 3,068,399 of Felix Bloch, Martin E. Packard and James N. Shoolery discloses a technique for simplifying such multiplet spectral lines of a group of particles under observation wherein a strong second magnetic field is applied at the resonance frequency of a second spin-coupled group, thereby reducing the spin-spin interaction of the two groups and hence the splitting of the spectral lines. It has been found, however, that when the second group is itself split by several spins or by two or more groups, as is frequently the case, then this simple double resonance technique will leave a residual line splitting which can be as complicated as the original splitting.

Accordingly it is the principal object of the present invention to effect a more complete decoupling of spin-coupled gyromagnetic particles. Generally speaking this is accomplished by introducing an additional decoupling field at a frequency substantially equal to the Larmor frequency of the decoupled particles in a magnetic field having an amplitude substantially equal to the amplitude of the first decoupling field.

In accordance with conventional gyromagnetic resonance terminology, the amplitude of an alternating magnetic field is taken as the amplitude of the rotating field which couples to the precessing spins. In the unusual situation where a linearly polarized field is applied, this field has two counter-rotating components only one of which couples to the spins, and thus the amplitude of the gyromagnetic resonance field is one-half that of the linearly polarized field.

Figure 2:
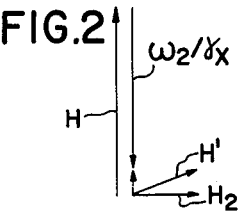
Figure 3:
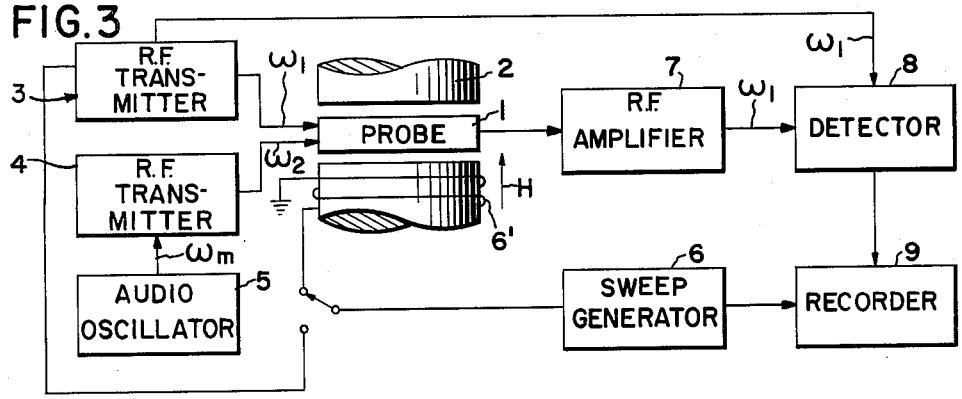
Figure 4:
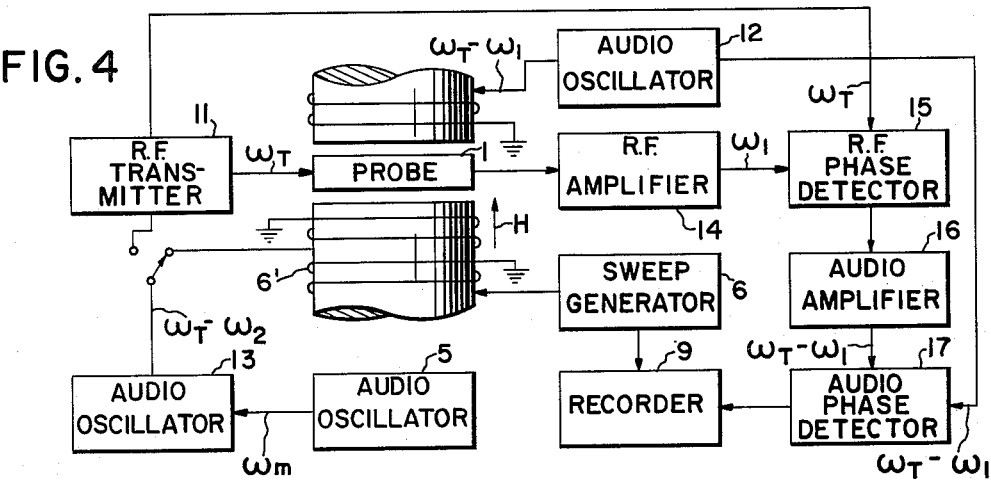
Figure 5:
Figure 6:

The various features and advantages of the present invention will become apparent after a perusal of the following specification taken in connection with the accompanying drawings wherein, FIG. 1 is a schematic spectral plot of three spin-coupled groups of gyromagnetic nuclei, used in the explanation of the present invention, FIG. 2 is a magnetic field vector diagram used in the explanation of the present invention, FIG. 3 is a block diagram of a gyromagnetic resonance spectrometer in accordance with the present invention, FIG. 4 is a block diagram of another form of gyromagnetic resonance spectrometer in accordance with the present invention, FIG. 5 is a series of spectral traces run on a single sample in order to illustrate the advantages of the present invention, and FIG. 6 is a second series of traces run on a different sample in order to further illustrate the advantages of the present invention.

The present invention will be explained by reference to FIG. 1 which is a plot of the gyromagnetic ratios $\gamma$ of three groups A, X, K of spin-coupled gyromagnetic particles, for example nuclei, in a single sample. If the ratio $\omega/H$ were swept throughout the entire spectral range, then spectral lines from each group would appear in the vicinity of the gyromagnetic ratio $\gamma$ for that particular group. For purposes of the present invention, group A will be taken as a group whose spectral lines are being observed by the application of a weak alternating magnetic field $H_1$ in the vicinity of the Larmor frequency $\omega_1 = \gamma_A H$ of group A. Group X is a group whose spins are being decoupled from that of group A by the application of a strong alternating magnetic field $H_2$ ($H_2$ larger than the spin coupling which is measured by the spin coupling constant J divided by $\gamma$) in the vicinity of the Larmor frequency $\omega_2 = \gamma_X H$ of group X. And group K represents any other group which is spin coupled to group X.

FIG. 2 illustrates the magnetic field seen by group X in a coordinate system rotating at the frequency $\omega_2$, the vector $H_2$ of the alternating field of frequency $\omega_2$ being stationary in this coordinate system. Also the effective value of the polarizing field H for this coordinate system is reduced by the amount $\omega_2/\gamma_X$. The particles of group X which are in exact resonance with the $H_2$ field see no effective H field, and hence are polarized along the $H_2$ field which is at right angles to H. Since these resonant particles have no static component of spin in the H direction, they are completely decoupled. Because the particles of group X are also coupled to group K, there will be a splitting of group X such that when some of the particles of this group are at resonance, others are not. For these non-resonant particles, there will exist a small component of effective H field (dotted line). Consequently, the non-resonant particles see a resultant polarizing field H', and the spins of these nuclei which line up with H' do have a static component in the H direction and hence are still partially coupled to group A. With the simple double resonance decoupling technique, this coupling can result in a significant residual splitting of the group A spectral lines unless an undesirably large $H_2$ is used.

In accordance with the present invention this residual coupling is substantially eliminated by the application of a third alternating field $H_m$ at the Larmor frequency $\gamma_X H'$ of group X particles in the H' field. This $\omega_m$ field effects a resonant precession of the particles in the plane perpendicular to H' which averages out the residual splitting. In still more complicated samples where some nuclei are not resonant with H', the process can be repeated by the addition of still another alternating field at the Larmor frequency of the effective field in a coordinate system rotating at $\omega_m$ plus $\omega_2$.

Since $H_2$ is large compared to the spin coupling constants (expressed in frequency units), the magnitude of H' will to a good approximation be equal to $H_2$, so that the desired $\omega_m$ is substantially equal to $\gamma_X H_2$. An exact analysis indicates that the small difference between $H_3$ and H', which usually is not of practical significance, is given by the expression $$\frac{(2\pi J_{AX}E_A + 2\pi J_{KK}M_K)^2 - (2\pi J_{AX}[M_A-1] + 2\pi J_{KK}M_K)^2}{2\gamma_X H_2}$$

where $J_{AX}$ is the spin coupling constant between groups A and X, $J_{KX}$ is the spin coupling constant between groups K and X, $M_A$ is the magnetic quantum number of the spins of group A, and $M_K$ is the magnetic quantum number of the spins of group K.

Even in situations where complete decoupling by a simple double resonance is possible, the present invention, using a second decoupling field at a frequency substantially equal to $\gamma_X H$, has the advantage that the frequency of the $H_2$ field can vary to a larger extent from the exact Larmor frequency $\omega_2 = \gamma_X H$ without substantial loss of decoupling.

Although in principle the second decoupling field $H_m$ can be applied as a direct amplitude modulation of the H field, this has the complicating effect of also modulating the resonance of the group A. The preferable method is to frequency modulate the $\omega_2$ field at the frequency $\omega_m$, this having the effect of establishing two magnetic vectors which rotate orthogonally about the $H_2$ vector at frequency $\omega_m$, one of these vectors effectively coupling to the spins.

FIG. 3 shows a gyromagnetic resonance spectrometer in accordance with the present invention. The probe 1, containing the sample, is positioned in the unidirectional polarizing field H of an electromagnet 2. A first R.F. transmitter 3 supplies an alternating magnetic field $H_1$ to the probe sample at a frequency $\omega_1$ substantially equal to the gyromagnetic resonance frequency in the field H of the group A of gyromagnetic particles, and a second R.F. transmitter 4 supplies a decoupling field $H_2$ at a frequency $\omega_2$ substantially equal to the gyromagnetic resonance frequency in the field H of the group X of gyromagnetic particles. Both alternating fields are directed substantially at right angles to H. The output of transmitter 4 is frequency modulated by an audio frequency oscillator 5 at a frequency $\omega_m$ approximately equal to $\gamma_X H_2$.

A sweep generator 6 of the conventional saw-tooth type sweeps the ratio $\omega_1/H$ through the spectral lines of group A, by sweeping the polarizing field via bias coil 6' (or alternatively by sweeping the frequency of the transmitter 3) with a relatively long period on the order of 1–10 minutes.

The probe 1 is of any suitable design known in the art which performs the function of altering the coupling between the R.F. transmitter 3 and the R.F. receiver amplifier 7 in accordance with the resonance of the group A particles. For example, the probe may be of the crossed-coils induction type or of the single-coil absorption type. As the field is swept, the R.F. input to amplifier 7 is detected by detector 8 to present a spectral trace on graphic recorder 9 of the spectral lines of group A.

FIG. 4 shows another form of gyromagnetic resonance spectrometer using only one basic R.F. transmitter, and also sideband resonance techniques. In this case, the frequency $\omega_T$ of R.F. transmitter 11 is offset from the central Larmor frequency $\omega_1$ by an amount equal to the frequency ($\omega_T - \omega_1$) at which the amplitude of the H field is modulated by audio oscillator 12, thereby exciting a sideband gyromagnetic resonance of group A. Similarly, primary spin decoupling is effected by exciting a sideband gyromagnetic resonance of group X, the $\omega_T - \omega_2$ output of oscillator 13 being used either to amplitude modulate the H field or to frequency modulate the R.F. transmitter. This establishes an effective $H_2$ field given by the equation $$H_2 = J_0(\beta_1)J_1(\beta_2)J_0(\beta_m)H_T$$

where the $\beta$'s are the respective modulation indices of the $\omega_T - \omega_1$, $\omega_T - \omega_2$ and $\omega_m$ modulations, and $J_0$ and $J_1$ are the zero and first order Bessel functions. The second decoupling field is established by frequency modulating oscillator 13 at the frequency $\omega_m$ (substantially equal to $\gamma_X H_2$) of oscillator 5. The decoupled spectrum of group A is then obtained by amplifying the $\omega_1$ signal from probe 1 in amplifier 14, comparing this signal in R.F. phase detector 15 with a reference signal from transmitter 11 to obtain an audio output at the modulation frequency $\omega_T - \omega_1$, amplifying this audio output in amplifier 16, and comparing the amplified audio output in audio phase detector 17 with a reference signal from audio oscillator 12 to obtain a D.C. output which is recorded by recorder 6 in synchronism with the sweep generator 9. Since this sideband detection derives the D.C. output from a signal at an audio field modulation frequency, the problem of spectral baseline instability due to drifts in probe balance is eliminated.

FIG. 5 is a series of spectral traces run from a sample of $CH_3I$ enriched in $C^{13}$. The usual undecoupled proton ($H^1$ nucleus) spectrum is shown in the upper trace as a result of sweeping the frequency of the $H_1$ field having an average frequency $\omega_1$ of approximately 60 mc. The two outside lines arise from protons which are coupled to a $C^{13}$ nucleus and the center line is from protons in molecules with the non-gyromagnetic $C^{12}$ nucleus. The middle trace was obtained while simultaneously irradiating the $C^{13}$ spectrum with an R.F. field of amplitude $H_2=0.54$ gauss and frequency $\omega_2=15.1$ mc. The residual splitting is clearly evident in the trace. Finally the lower trace was obtained while the field $H_2$ was frequency modulated at 600 c.p.s. (the exact Larmor frequency in an 0.54 gauss field is 580 c.p.s.), with a modulation index $$\beta_M = \frac{\gamma X H_m}{\omega_m}$$

of approximately 0.5. An essentially complete collapse of the proton spectral lines is thereby obtained.

FIG. 6 is a series of spectral traces run from a sample of ethyl alcohol $CH_3CH_2OH$. The usual spin-spin coupled spectrum of the $CH_2$ protrons is shown in the upper trace as a result of sweeping the H field with the $H_1$ field held fixed at $\omega_1=60$ mc. The line splitting is caused by spin coupling to the $CH_3$ protons which are chemically shifted from the $CH_2$ protons by approximately 145 c.p.s. The middle trace shows the effect of turning on the $H_2$ field with the frequency difference $\omega_1 - \omega_2$ adjusted to give the narrowest $CH_2$ resonance. In the lower trace $\omega_2$ was frequency modulated at 30 c.p.s., the Larmor frequency in the $H_2$ field, resulting in a substantial further narrowing of the $CH_2$ resonance.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The method of decoupling the spins of a second group of gyromagnetic particles from the spins of a first group of gyromagnetic particles in a sample containing at least said first and second groups in a polarizing unidirectional magnetic field, which method comprises: applying to said sample a first alternating magnetic field having a frequency substantially that of the Larmor frequency of said first group in said unidirectional field, and detecting the gyromagnetic resonance of such first group; applying a second alternating magnetic field to said particles at a frequency substantially equal to the gyromagnetic resonance frequency of said second group of particles in said unidirectional field; and applying a third alternating magnetic field to said particles at a frequency substantially equal to the gyromagnetic resonance frequency of said second group of particles in a magnetic field having an amplitude substantially equal to the amplitude of said second alternating magnetic field.

2. The method of claim 1 wherein said third alternating magnetic field is established by frequency modulating said second alternating magnetic field at a frequency substantially equal to the gyromagnetic resonance frequency of said second group of particles in a magnetic field having an amplitude equal to the amplitude of said second alternating magnetic field.

3. Gyromagnetic resonance apparatus comprising: means for producing a polarizing unidirectional magnetic field; a sample probe for accommodating first and second spin-coupled groups of gyromagnetic particles in said polarizing field; transmitter means for applying a first alternating magnetic field to said probe substantially at right angles to said polarizing field and at a frequency substantially equal to the gyromagnetic resonance frequency of said first group of particles in said polarizing field; a receiver coupled to said transmitter means through said probe, the coupling between said transmitter means and said receiver being altered by the gyromagnetic resonance of said first group of particles; means for sweeping the ratio of the frequency of said transmitter means to the amplitude of said polarizing field through the gyromagnetic spectral range of said first group of particles; means detecting the amount of energy received by said receiver from said transmitter means for presenting a display of the gyromagnetic spectral lines of said first group of particles as a function of said sweep means; means for effectively applying a second alternating magnetic field to said probe substantially at right angles to said polarizing field and at a frequency substantially equal to the gyromagnetic resonance frequency of said second group of particles in said polarizing field, the amplitude of said second magnetic field being larger than the spin coupling between said groups; and means for applying a third alternating magnetic field to said probe substantially at right angles to said second alternating field and at a frequency substantially equal to the gyromagnetic resonance frequency of said second group of particles in a magnetic field having an amplitude substantially equal to the amplitude of said second alternating magnetic field, thereby reducing the splitting of the spectral lines of said first group of particles due to spin-spin interaction with said second group of particles.

4. Apparatus according to claim 3 including a transmitter generating an output at the frequency of said second alternating magnetic field, and a generator for frequency modulating said last-named transmitter at a frequency substantially equal to the gyromagnetic resonance frequency of said second group of particles in a magnetic field having an amplitude equal to the amplitude substantially of said second alternating magnetic field to thereby establish said third alternating magnetic field.

5. Apparatus according to claim 3 including means for modulating the amplitude of said polarizing magnetic field at a given frequency, said transmitter means generating an output which is displaced in frequency from the central gyromagnetic resonance frequency of said first group of particles by an amount substantially equal to said given modulation frequency to thereby establish said first alternating magnetic field which excites a sideband gyromagnetic resonance of said first group of particles, and means for detecting variations in the energy received by said receiver at said given modulation frequency.

6. Apparatus according to claim 3 including means for modulating the ratio of the output frequency of said transmitter means to the intensity of said polarizing field at a frequency substantially equal to the difference between the frequency of said transmitter means and the central gyromagnetic resonance frequency of said second group of particles to thereby establish said second alternating magnetic field which excites a sideband gyromagnetic resonance of said second group of particles, and means for frequency modulating said last-named modulating means at a frequency substantially equal to the gyromagnetic resonance frequency of said second group of particles in a magnetic field having an amplitude substantially equal to the amplitude of said second alternating magnetic field to thereby establish said third alternating magnetic field.

7. A gyromagnetic resonance apparatus comprising: a sample including at least first and second groups of particles disposed in a polarizing unidirectional magnetic field; means for applying to said sample a first alternating magnetic field having a frequency substantially that of the Larmor frequency of said first group; means for detecting the gyromagnetic resonance of such first group; means for applying to said sample a second alternating magnetic field having a frequency substantially that of the Larmor frequency of the second group for decoupling the spins of said second group from the spins of said first group; and means for modulating said second alternating magnetic field applying means at a third frequency substantially equal to the product of the gyromagnetic ratio of the second group and the magnitude of said second alternating magnetic field.

References Cited by the Examiner

Anderson: "Journal of Chemical Physics," vol. 37, No. 1, July 1962, pp. 85–103 inclusive. (Copy in Patent Office Scientific Library.)

Freeman: "Molecular Physics," vol. 3, No. 5, September 1960, pp. 434–439 inclusive. (Copy in Group 220 of Patent Office.)

Kaiser: "The Review of Scientific Instruments," vol. 31, No. 9, September 1960, pp. 963–965 inclusive. (Copy in Patent Office Scientific Library.)

Redfield: "Physical Review," vol. 98, No. 6, June 15, 1955, pp. 1787–1809 inclusive. (Copy in Patent Office Scientific Library.)

CHESTER L. JUSTUS, *Primary Examiner.*

MAYNARD R. WILBUR, *Examiner.*

UNITED STATES PATENT OFFICE
CERTIFICATE OF CORRECTION

Patent No. 3,244,968                          April 5, 1966

Forrest A. Nelson et al.

It is hereby certified that error appears in the above numbered patent requiring correction and that the said Letters Patent should read as corrected below.

Column 3, lines 6 to 8, the equation should appear as shown below instead of as in the patent:

$$\frac{(2\pi J_{AX}M_A + 2\pi J_{KX}M_K)^2 - (2\pi J_{AX}[M_A - 1] + 2\pi J_{KX}M_K)^2}{2\gamma_X H_2}$$

column 4, line 14, for "6" read -- 9 --; same line 14, for "9" read -- 6 --; column 5, line 52, after "amplitude", first occurrence, insert -- substantially --; lines 52 and 53, strike out "substantially".

Signed and sealed this 5th day of November 1968.

(SEAL)
Attest:

EDWARD M. FLETCHER, JR.
Attesting Officer
                                       EDWARD J. BRENNER
                                     Commissioner of Patents